May 21, 1946.  W. J. CAMERON  2,400,483
CAMERA
Filed Aug. 6, 1943  3 Sheets-Sheet 1
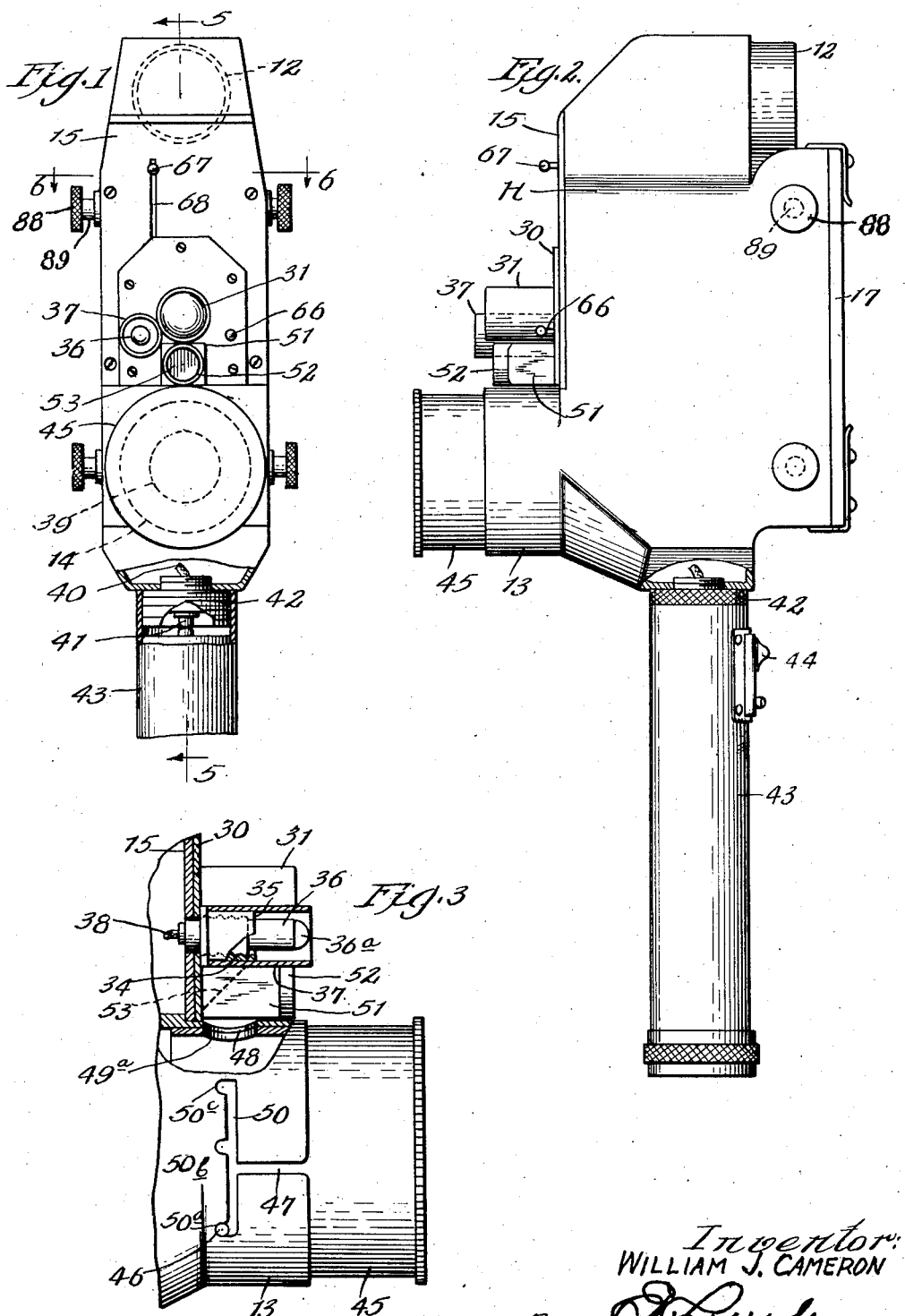
Inventor:
WILLIAM J. CAMERON

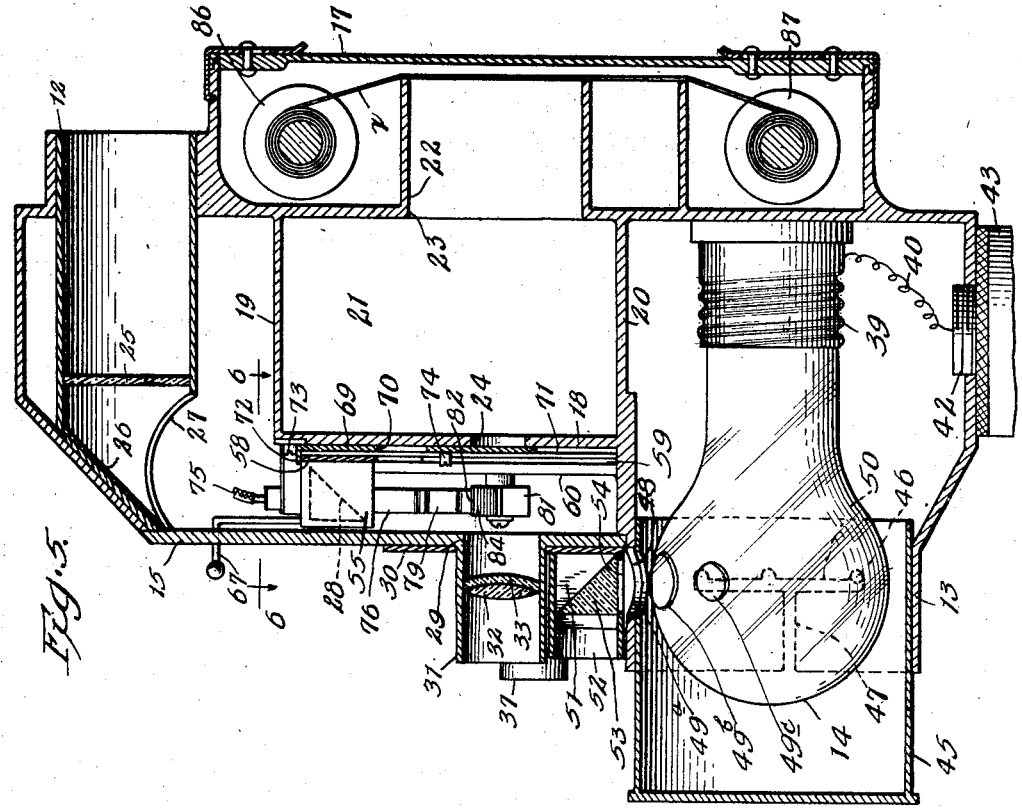
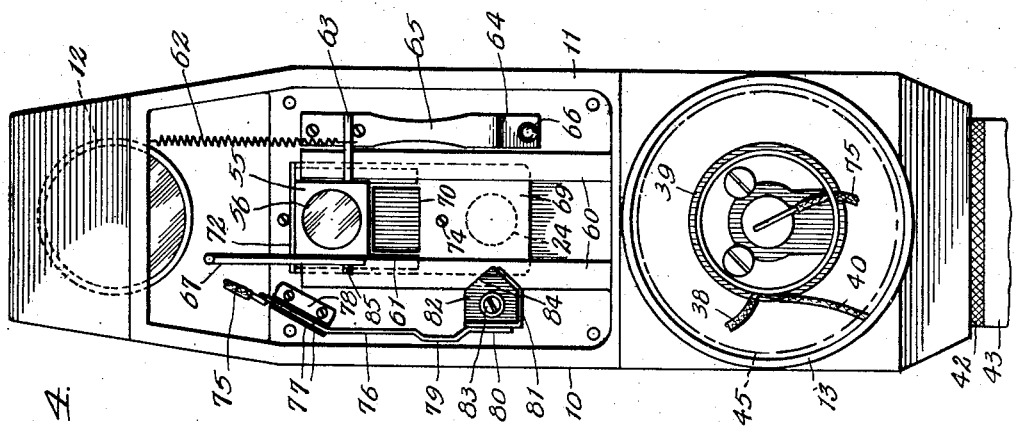

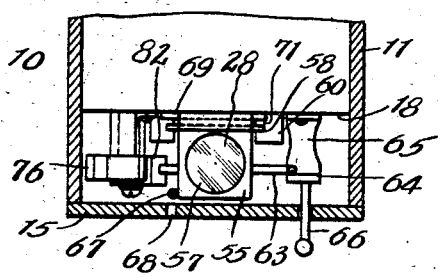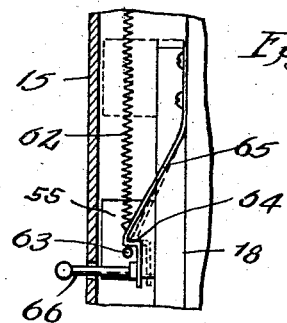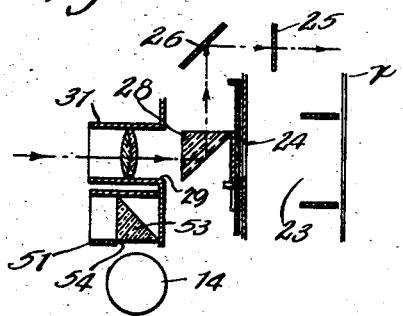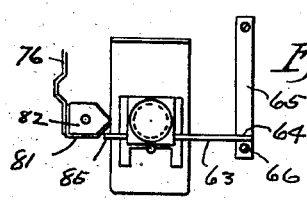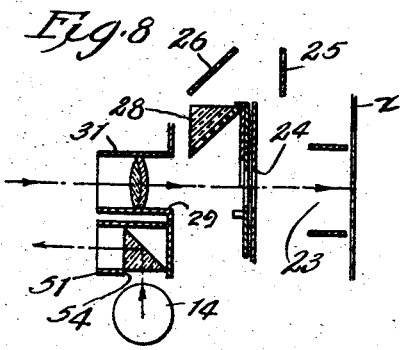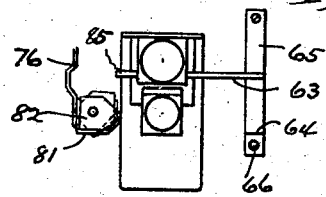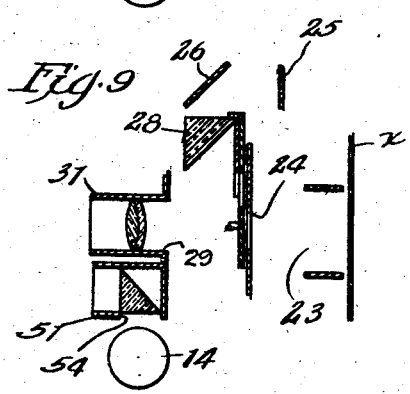

Patented May 21, 1946

2,400,483

UNITED STATES PATENT OFFICE 2,400,483

CAMERA

William J. Cameron, Chicago, Ill.

Application August 6, 1943, Serial No. 497,657

9 Claims. (Cl. 95—42)

My invention relates to photography, and more particularly to a camera for photographing of close-up objects. This camera has been especially designed for use by physicians, surgeons, dentists, and the like, for photographing portions of the human anatomy in order that a permanent photographic record may be secured and retained for ready reference.

The apparatus which I have invented has incorporated in it means for effectively illuminating the object to be photographed so that said object may be readily brought into focus by means of a finder device that is of the periscopic type. Combined with the periscopic finder, I have provided a novel shutter mechanism that is operated by a movable portion of the finder structure. It may be here stated that the finder focuses through the photographic lens of the camera and, prior to the operation of the shutter, one of the elements of the periscopic structure is moved away from the focal axis of the lens immediately before the shutter is opened. The operation of the shutter is preferably performed by the mobile element of the finder. Further illumination of the object at the moment it is photographed, is secured by operating a flash-light bulb which is completely enclosed within the camera casing, and the light from this flash bulb is directed to the object by means of a tube eccentrically disposed with relation to the axis of the flash bulb and which contains a reflecting element to direct the light rays outward toward the object. In connection with the flash bulb I provide a diaphragm member which regulates and controls the quantity of light that is directed upon the object thereby dispensing with the usual diaphragm at the photographic aperture of the camera. Means are provided whereby the flashing of the bulb is synchronized with the operation of the shutter so that said bulb is flashed at the proper moment for best photographic results. The electrical system of this camera receives its electric charge from a small storage battery that is housed within a cylindrical member, this member is arranged so that it provides a convenient handle by which the camera may be manually held by the operator during use. The arrangement of the shutter and its operation is co-ordinated with the periscopic elements of the finder which renders it necessary to use the finder prior to operating the camera to photograph an object thus eliminating the possibility of the operator photographing the object prior to viewing and focusing the object in the finder.

The device which I have invented is novel in construction and is compact in arrangement and disposition of its parts; it is dependable in operation and performs its functions with a high degree of accuracy. The parts of my device are sturdy, and the apparatus is economical to produce so that it may be sold for a reasonable retail price.

I prefer to accomplish the numerous objects of my invention and to practice the same in substantially the manner hereinafter fully described and as more particularly pointed out in the claims. Reference is herein made to the accompanying drawings that form a part of this specification.

In the drawings:

Figure 1 is a vertical front elevation of my improved photographic apparatus and drawn to a reduced scale.

Figure 2 is a vertical elevation looking at the right hand side of the structure shown in Figure 1, with a part of the battery casing and adjacent camera housing in section.

Figure 3 is a fragmentary view of the lower portion of the structure and looking at the left side of Figure 1, drawn to a larger scale and partly in section.

Figure 4 is a vertical elevation of the interior mechanism with the front plate of the housing and the cap of the flash light chamber or cell removed.

Figure 5 is a vertical section on line 5—5 of Figure 1 looking to the left in the direction of the arrows and drawn full size.

Figure 6 is a horizontal section on line 6—6 of Figure 5, looking down in the direction of the arrows.

Figure 7 is a diagrammatic view in vertical section showing the optical elements in the position to focus the image upon the finder screen.

Figure 8 is a diagram of the same parts shown in Figure 7 but in the position when the bulb is flashed and the photographic aperture is opened to expose the sensitized element or film.

Figure 9 is another diagram in which the parts have moved to their final position with the aperture closed and the finder inoperative.

Figure 10 is a front view of the elements in the position shown in Figure 7 with the trigger mechanism "set."

Figure 11 is a front view of the elements in the position shown in Figure 8 with the trigger mechanism "released."

Figure 12 is a side elevation showing details of the trigger mechanism.

It will be understood the drawings, which are more or less schematic, are for the purpose of illustrating a typical or preferred form in which my invention may be made, and it will be appreciated that changes or refinements may be made in the structure shown without departing from the principles of my invention as expressed in the appended claims. In the drawings the same reference characters are used to identify like parts appearing in different views.

The housing preferably embodies a casing consisting of vertical sidewalls 10 and 11 that have their upper portions inclined inward toward each other in the manner of the mansard or curbed roof, and in the top of this housing there is the horizontally disposed viewing tube 12 of the finder of the focusing structure. The front of the housing has a cylindrical embossment 13 in this lower portion between the planes of the side walls 10 and 11 which provides an enclosure for the flash bulb 14. The open front of the housing above this tubular extension is normally closed by a removable front plate 15. The film box, which houses the film x, is of somewhat angular shape and is at the rear of the camera housing and it has a removable back plate 17 permitting access to the interior thereof in the usual manner for the purpose of removal and replacement of the photographic film.

Within the central portion of the camera housing there is a vertical partition 18, and horizontal partitions 19 and 20 that extend from the adjacent upper and lower margins of the vertical partition to the rear wall of the housing and also from side wall to side wall thereof. The forward portion of the lower partition 20 is in alinement with the lower edge of the front plate and extends entirely across from the front to rear of the housing to provide a sealing of the flash light chamber or cell in the bottom of the housing which has been hereinbefore mentioned. The partitions 18, 19 and 20 provide a closed chamber 21 within the central portion of the camera that communicates at its rear with the film framer 22 within the film box which is in front of said framer. There is a large opening 23 in the housing wall between the chamber and the film box, and axially alined therewith is the photographic light aperture 24 in the vertical partition 18.

The inner end of the finder tube 12 is provided with a ground glass image-receiving disk 25, upon which the image is reflected by a mirror 26 disposed at an angle of 45 degrees to the axis of the tube. The mirror is mounted upon an inclined inner portion of the tube near the front of the housing and there is a lateral opening 27 in the lower segment of the tube below the mirror as shown in Figure 5. A mobile or movable prism 28 transmits light rays and the image of the object in an upwardly direction to the mirror 26 and said prism is adapted to be moved into a position in front of the photographic aperture 24 during focusing and is then moved away from the aperture when the film is being exposed. This movement actuates the shutter in a manner to be later described herein. When the prism 28 is in the position shown in full lines in Figure 7 it will be opposite and in alinement with the opening 29 in the front plate.

The front plate 15 has an apertured escutcheon 30 as shown in Figure 1, which escutcheon 30 carries certain instrumentalities for photographing, for illuminating the object while focusing, and for controlling and properly directing the light rays from the flash bulb. A lens tube 31 surrounds the aperture in the escutcheon plate and axially alines with the aperture 29 in the front plate and also the photographing aperture 24 in the vertical partition 18. The lens tube contains the acromatic photographic lens of short focus consisting of a double-convex crown-lens 32 and a concavo-convex flint-lens 33. When the prism 28 is in a lowered position, in focal axis of the optical unit, the image of the object passes through the lens and is reflected by the prism 28 toward the mirror 27 and then horizontally to the ground glass plate 25 in the viewing tube. The focusing is accomplished by the operator, by moving the camera toward or from the object until the image of the object is sharply defined upon the ground glass and may then photograph the object in the manner described herein.

This camera is, as before stated, adapted for use by doctors, dentists, surgeons and the like and it frequently becomes necessary to photograph tissue within cavities of the human body, such as in the oral or nasal cavity and the eyes. I have provided means whereby the object or tissue to be photographed may be illuminated sufficiently during focusing to permit of the projection of a clear image on the finder or focusing elements. In order to do this I have mounted a lamp socket 34 on the escutcheon 30, at one side of the lens tube 31, and surrounding said socket there is a tubular stub 35. The electric bulb 36 is inserted in the socket and a protecting guard or sleeve 37 is removably mounted upon the stub 35 to cut off the lateral light rays from the lamp and concentrate the light upon the object. The socket and bulb receive current from the battery through a conductor 38 which leads to the flash bulb socket 39 within the flash chamber at the bottom of the housing, and a conductor 40 leads from the flash bulb socket to the central contact element 41 in a coupling nipple 42 that is screwed into the bottom of the housing and has a threaded outside extension on to which the battery casing 43 is screwed. The other side of the circuit to the lamp 36 is grounded in the metal housing. When the switch 44 on the battery casing is moved to an "on" position the current will illuminate the bulb 36 which has a lenticular outer end 36a and the light rays will pass out of the end of the guard sleeve 37 directly to the object being photographed thus creating sufficient illumination to permit the image of the object to be sharply defined upon the ground glass screen in the finder and focusing tube 12.

The outer end of flash-light cell embossment 13 is closed by a removable cap 45 having a cylindrical body portion that is provided with a pin 46 to enter in the portion 47 of a bayonet slot in said embossment. The upper segment of flash-cell embossment 13 has a light discharge opening 48, and any suitable means such as filters or diaphragms may be employed for the purpose of controlling the amount of light that is emitted from the flash-cell. As typifying a means for controlling the light I have shown the cylindrical wall of the cap 45 provided with a plurality of diaphragm openings 49a, 49b, and 49c that are adapted to be selectively alined with the aperture 48 by bodily rotating the cap 45 in its mounting. It will be understood that light control may be effectively secured by means of filters either colored or of different densities of translucency, or both colored filters and the diaphragm openings may be used in association. A cross slot 50, having notches 50a, 50b, and 50c, thus adapting the cap to be moved outwardly to disengage the pin 46 from a notch and then bodily rotating the cap in the proper direction to enter the pin into another notch, thereby permitting another light control means being used to increase or diminish the amount of light passed out of the flash-light cell to illuminate the object.

A rectangular shaped box 51 is mounted upon the escutcheon 30 immediately below the lens tube 31 and it has an annular outer portion 52 the axis of which is parallel with and vertically alines with the axis of the lens tube and the focal axis of the lens. The box 51 contains a prism 53 extending over a circular opening 54 in its bottom wall that alines with the diaphragm aperture in the cylindrical wall of the cap. When the current is turned on, the bulb will be flashed, and as said bulb is below the diaphragm aperture the light rays of the flash will pass through the aperture and enter the box 51 and will be reflected by the prism horizontally outward through the cylindrical end of the box directed upon the object being photographed. This arrangement permits the operator to control the amount of light by selecting the desired diaphragm. In addition, all danger of explosion of the bulb, which would shatter the glass thereof, is avoided, as well as the risk of injury to the subject photographed.

The prism 28, which transmits the image to the finder and focusing device is enclosed in a box 55 of rectangular shape that has a light opening 56 in its vertical front wall through which the image is received from the lens tube 31. Said box has another light opening 57 in its top wall through which the image passes up to the oblique mirror 26. This box, with its prism, is of a mobile character and is adapted to be moved up and down so that it may be disposed in horizontal or axial alinement with the lens tube 31 or may be positioned out of range thereof.

The rear of the box 55 is mounted upon a slide plate 58 that has its margins movably engaged in guide slots 59 formed in facing portions of vertical parallel ribs 60 on the front surface of the partition 18 and which extend substantially from the top to the bottom thereof. The lower portion of slide plate 58 has parallel side extensions or legs 61 that project down below the box to form an upwardly extending notch or recess that is of greater outside dimensions than the diameter of the photographic aperture 24 in the partition 18. A coiled contraction spring 62 is connected at one end to the housing or casing wall or other stationary part, and its other end is connected to the box 55 or its slide plate 58, preferably by means of an elongated lateral pin 63. This structure provides a sliding automatically returnable carrier for the prism 28, and it also affords means for automatically moving the shutter to close the photographic aperture 24 immediately after exposure of the film, in fact this carrier is a portion of the shutter structure as well as the actuating mechanism. When the slide plate and box are moved downward the pin 63 is adapted to engage with and be held by a shoulder 64 on a spring pawl 65 that is anchored at one end of the partition wall 18. The free end of the pawl 65 has a lateral pin 66 secured to it that passes out through a small guide opening in the front plate 15 where it may be employed by the operator to depress the pawl 65 and release the carrier for the prism 28 so that the pin 63 is disengaged from the shoulder 64 and the spring 62 will pull the sliding carrier with its prism 28 upwardly to the position shown in Figures 3 and 4, or as shown dotted in Figure 12. An operating handle 67 in the form of an L-shaped rod is mounted on the box 55 or other part of the carrier and extends through the vertically elongated slot 68 in the front plate 15 of the casing, so that the operator may readily move this operating rod in a downward direction until the trigger elements (the pawl shoulder 64 and pin 63) have been engaged. In this lower position the prism receives the image from the lens through the opening 29 in the front of the housing and reflects the image upwardly to the finder mirror. When released this carrier travels upward and clears the optical axis of the camera so that there is nothing to interfere with the exposing of the sensitized film to photograph the object.

Between the carrier slide plate 58 and the vertical partition 18 there is a sliding shutter plate 69 that is considerably longer than said slide plate and is provided with a rectangular aperture 70 intermediate its ends. As shown in Figure 4 the rectangular aperture 70 is disposed back of the upwardly extending recess between the legs or the extensions 61 of the carrier slide 58, and it will be noted that the dimensions of this rectangular aperture are greater than the diameter of the photographing aperture 24 in partition 18. The side margins of the shutter plate 69 operate vertically in the guide grooves 71 in the ribs 60, and they are in a plane back of guide slots 59 and close to the surface of the vertical partition 18. The upper margin of the shutter plate has a lateral lip 72 that is adapted to be engaged by the top of the carrier slide plate 58, and there is a stop or pin 73 on the partition against which the upper edge of the shutter structure abuts when the parts (the shutter plate and prism carrier) are in uppermost position as shown in Figure 4. There is a stop or pin 74 on the shutter plate below the rectangular aperture 70 against which the prism carrier is adapted to engage when the members of the shutter mechanism are moved in a downward direction to "set" the camera. When the prism carrier begins its movement downward the portion of the slide plate 58 back of the prism will close aperture 70 in the shutter plate and upon engagement with the stop 74 the aforesaid slide will move the shutter plate until the rectangular aperture 70 is opposite the photographic aperture 24. In this position the film is not exposed because the shutter aperture 70 is closed by the carrier slide plate. When the trigger mechanism is released, by depressing the pawl 65, the carrier will move upwardly independent of the shutter until it has passed above the shutter aperture 70 whereupon the film is momentarily exposed. Continued upward movement of the carrier causes the latter to engage the lip 72 and then bodily lift the shutter plate so that the lower imperforate portion of said plate is then disposed in front of the photographic aperture 24 and light is shut off from the film. It is understood that this movement in an upward direction is rapid so that an instantaneous exposure is secured of approximately $\frac{1}{25}$ of a second of duration.

As before stated, the object being photographed is adapted to be brilliantly illuminated by means of the flash-bulb 14, when the light from said bulb passes through the diaphragm opening to the prism 53 and then out of the housing to the object. This flashing of the bulb is synchronized with the exposure of the film at the moment the shutter aperture 70 is open in front of the photographic aperture 24. A conductor 75 leading from the flashing bulb socket 39 is connected at its upper end to a spring terminal strip 76 that is mounted between insulation pieces 77 on a bracket 78 which is attached to the upper portion of the vertical partition 18. The terminal spring extends down to approximately the horizontal plane of the photographic aperture 24 and near its end is provided with an offset portion 79. The flat portion of the terminal spring 80 beyond the offset is engaged with the metalic strip 81 that forms a contact member that extends around the adjacent face, the lateral side and the oblique edge of the irregular or gable-ended block 82 of insulation. The block is rotatably mounted upon a suitable pivot 83 so that it may be partially rotated in the manner shown in Figure 11. When the carrier is moved down to the focusing position, the oblique face 84 of the insulation block 82 is adapted to be engaged by a lateral pin 85 or other projection on the carrier which rotates the block but does not form the circuit because the contact plate 81 was not engaged by pin 83. The spring terminal member returns the block to normal position after the pin passes beyond the apex of the block. In this position the projecting member or pin 85 is near the oblique face of the block which carries a portion of the contact metal 81. When the trigger mechanism has released the prism carrier, the latter moves upward at high speed and the pin 85 touches the contact 81 and grounds the circuit in the metal body of the carrier housing so that the bulb 14 is flashed. This flashing of the bulb is accurately timed and is synchronized to the moment the film is exposed. That is at the moment the prism carrier has cleared the shutter aperture 70 in its upward movement and prior to said carrier starting to move the shutter upwardly to close the photographic aperture 24.

The film is disposed on suitable spools 86 and 87, the former being a winding spool that is operated by rotating the movable hand-wheel 88 on the exterior of the casing of the camera. Trunnion 89 for the winding spool projects through the side of the film-box and camera case, and any suitable means may be provided to prevent reverse rotation of said spool.

What I claim is:

1. A camera embodying a housing; a lens in the front of said housing; fixed means in said housing defining an exposure chamber spaced from said lens, said means having an aperture alined with said lens; a reflector movable past said aperture; means for releasably maintaining said reflector in an obstructing position in front of said aperture to laterally divert light rays from said lens; viewing elements through which the diverted light rays are observed; and a sliding shutter plate having an opening normally alined with said aperture, said shutter plate adapted to be shifted by said reflector to close said light aperture after said reflector has moved away from said aperture, and tracks on said fixed means at opposite sides of said aperture for guiding said reflector.

2. A camera as defined in claim 1 wherein the reflector is spring actuated and the sliding shutter plate is movable in the same direction as the reflector.

3. A camera comprising a housing; a lens at the front of said housing; fixed means in said housing defining an exposure chamber spaced from said lens, said means having a photographic aperture back of and axially alined with said lens; a carrier movable transversely across the lens axis; a reflector mounted on said carrier adapted to laterally divert light rays from said lens; viewing elements for receiving the light rays diverted by said reflector; and a sliding plate provided with an opening normally alined with said photographic aperture, said plate co-acting with said carrier and adapted to be shifted during a portion of the movement of said carrier to position said plate in obstructing relation to the photographic aperture, and tracks on said fixed means at opposite sides of said aperture for guiding said reflector.

4. A camera comprising a housing; a lens at the front of said housing; fixed means in said housing defining an exposure chamber spaced from said lens, said means having a photographic aperture back of and axially alined with said lens; a carrier movable transversely across the lens axis; spring means for moving said carrier; a manually operable latch normally maintaining said carrier in obstructing relation to said aperture; a reflector mounted on said carrier adapted to laterally divert light rays from said lens; viewing elements for receiving the light rays diverted by said reflector; and a sliding plate provided with an opening normally alined with said photographic aperture; said plate co-acting with said carrier and adapted to be shifted during a portion of the movement of said carrier to position said plate in obstructing relation to the photographic aperture, and tracks on said fixed means at opposite sides of said aperture for guiding said carrier.

5. A camera comprising a housing; a lens at the front of said housing; fixed means in said housing defining an exposure chamber spaced from said lens, said means having a photographic aperture back of and axially alined with said lens; a carrier normally obstructing said aperture movable transversely across the lens axis; a reflector mounted on said carrier adapted to laterally divert light rays from said lens; viewing elements for receiving the light rays diverted by said reflector; a sliding shutter having an opening that is normally alined with said photographic aperture; means providing an operative connection between said carrier and shutter, said means being effective to permit movement of said carrier away from said aperture in advance of the movement of the shutter to open the photographic aperture; and trigger-controlled spring means for moving said carrier, and tracks on said fixed means at opposite sides of said aperture for guiding said carrier.

6. A camera embodying a housing; a lens in the front of said housing; fixed means in said housing defining an exposure chamber spaced from said lens, said means having a light aperture back of and alined axially with said lens; a spring returnable carrier movable transversely across the axis of said lens; a reflector mounted on said carrier adapted to laterally divert light rays from said lens when in an active position in the axis of said lens; means for releasably maintaining said carrier in a position to dispose said reflector alined with the lens axis; viewing elements adapted to receive the light rays which are diverted by said reflector; and a sliding shutter plate provided with an opening which is normally alined with said light aperture, said plate coacting with said carrier and adapted to be shifted thereby during a portion of the movement of said carrier to dispose said plate in a position to obstruct said light aperture, and tracks on said fixed means at opposite sides of said aperture for guiding said carrier.

7. A camera embodying a housing; a lens in the front of said housing; a wall therein defining an exposure chamber spaced from said lens, said wall having a light aperture alined axially with said lens; a carrier adapted for movement to close and open said aperture; a mobile reflector moved by said carrier past said aperture and adapted to laterally divert light rays from said lens when in front of said aperture; means for releasably maintaining said carrier in a position to dispose said reflector in front of said aperture; viewing elements through which the diverted light rays are observed; a sliding shutter plate provided with an opening which is normally alined with said light aperture; means operatively connecting said carrier and shutter plate for movement of the carrier independently of the shutter plate and also with the same; and tracks on said fixed means at opposite sides of said aperture for guiding said carrier and devices for moving said carrier.

8. A camera comprising a housing; a lens in the front of said housing; fixed means within said housing defining a closed lightproof chamber spaced from said lens and adapted to receive a light-sensitive medium, said means having a photographic aperture alined with said lens; a shutter plate slidable on said means and having an opening normally alined with said aperture; a sliding reflector normally positioned in front of said shutter opening for closing said photographic aperture; means releasably maintaining said reflector in said aperture closing position to laterally divert images received from said lens; viewing means for observing the images diverted from said reflector; and means effective upon the release of said reflector for moving said reflector away from its normal position to first uncover said photographic aperture and then to shift said shutter across said aperture to close the latter.

9. A camera comprising a housing; a lens in the front of said housing; fixed means within said housing defining a closed lightproof chamber spaced from said lens and adapted to receive a light-sensitive medium, said means having a photographic aperture alined with said lens; a shutter plate slidable on said means and having an opening normally alined with said aperture; a sliding carrier movable on said fixed means in front of said aperture; a reflector on said carrier to be normally positioned in front of said shutter opening for closing said photographic aperture; means releasably maintaining said reflector and carrier against the tension of said spring in said aperture closing position to laterally divert images received from said lens; tracks on said fixed means for guiding said carrier; viewing means for observing the images diverted from said reflector; and means effective upon the release of said reflector for moving said reflector away from its normal position to first uncover said photographic aperture and then to shift said shutter across said aperture to close the latter.

WILLIAM J. CAMERON.